US012589685B2

(12) United States Patent
Snyder et al.

(10) Patent No.: US 12,589,685 B2
(45) Date of Patent: *Mar. 31, 2026

(54) CHASSIS FOR RECREATIONAL VEHICLES HAVING A TRANSPORT AREA FOR A FLUID STORAGE VESSEL

(71) Applicant: Thor Tech, Inc., Elkhart, IN (US)

(72) Inventors: Jeffrey M. Snyder, White Pigeon, MI (US); Jonathan Gust, Middlebury, IN (US)

(73) Assignee: Thor Tech, Inc., Elkhart, IN (US)

( * ) Notice: Subject to any disclaimer, the term of this patent is extended or adjusted under 35 U.S.C. 154(b) by 444 days.

This patent is subject to a terminal disclaimer.

(21) Appl. No.: 18/345,652

(22) Filed: Jun. 30, 2023

(65) Prior Publication Data

US 2023/0356782 A1 Nov. 9, 2023

Related U.S. Application Data

(63) Continuation-in-part of application No. 17/487,067, filed on Sep. 28, 2021, now Pat. No. 11,858,405.

(51) Int. Cl.
| | |
|---|---|
| *B60P 3/32* | (2006.01) |
| *B62D 21/03* | (2006.01) |
| *B62D 21/16* | (2006.01) |
| *B62D 21/17* | (2006.01) |
| *B62D 21/20* | (2006.01) |

(52) U.S. Cl.
CPC ............... *B60P 3/32* (2013.01); *B62D 21/03* (2013.01); *B62D 21/16* (2013.01); *B62D 21/17* (2013.01); *B62D 21/20* (2013.01)

(58) Field of Classification Search
CPC ...... B60P 3/32; B60P 3/34; B60P 3/36; B62D 21/02; B62D 21/03; B62D 21/16; B62D 21/17; B62D 21/18; B62D 21/20; B60H 1/00564
USPC ............................ 296/156, 168, 203.01, 204
See application file for complete search history.

(56) References Cited

U.S. PATENT DOCUMENTS

| | | | |
|---|---|---|---|
| 6,231,115 B1 | 5/2001 | Crean | |
| 6,502,894 B1 | 1/2003 | Ingram et al. | |
| 11,235,637 B1 | 2/2022 | Goldenberg et al. | |
| 11,667,230 B2 * | 6/2023 | Snyder .................. | B62D 21/16 |
| | | | 296/168 |
| 11,858,405 B2 * | 1/2024 | Snyder .................... | B60R 16/08 |
| 2006/0012219 A1 | 1/2006 | Ingram et al. | |

(Continued)

*Primary Examiner* — Jason S Daniels
(74) *Attorney, Agent, or Firm* — Dinsmore & Shohl LLP

(57) ABSTRACT

A recreational vehicle may include a chassis, an axle assembly, a floor, and a vehicle body enclosing living quarters. A fluid storage vessel may be supported in the chassis. The chassis may include a first and a second longitudinal chassis member each having an upper and lower edge, and an inner and outer face. Cross members have a first and second ends connected to the first and second chassis member, respectively. The cross members have an upper and lower edges extending between the ends. The cross members have an end height at the ends and a midsection height that is greater than the end height. A transport area extends longitudinally between two cross members, transversely between inner faces of the longitudinal chassis members, and vertically between upper and lower edges of the cross members. The fluid storage vessel is disposed in at least a portion of the transport area.

15 Claims, 12 Drawing Sheets

(56)  References Cited

U.S. PATENT DOCUMENTS

| 2007/0007794 | A1 | 1/2007 | Bertoch et al. |
| 2012/0049486 | A1 | 3/2012 | Lee |
| 2021/0309141 | A1 | 10/2021 | Snyder et al. |

* cited by examiner

CHASSIS FOR RECREATIONAL VEHICLES HAVING A TRANSPORT AREA FOR A FLUID STORAGE VESSEL

CROSS-REFERENCE TO RELATED APPLICATIONS

This application is a Continuation in Part of U.S. patent application Ser. No. 17/487,067 filed Sep. 28, 2021, which is hereby incorporated by reference in its entirety.

FIELD OF THE INVENTION

The present disclosure relates to recreational vehicles, and more particularly, to recreational vehicles with a chassis configured to provide a transport area with increased height for a fluid storage vessel.

BACKGROUND OF THE INVENTION

Recreational vehicles take a variety of forms, including motorized vehicles and non-motorized trailers. Such recreational vehicles have a chassis supporting a floor and a vehicle body with the vehicle body enclosing a living quarters. The chassis typically includes longitudinal chassis members that are interconnected by cross members. A variety of equipment is disposed in the chassis, typically including multiple fluid storage vessel. These vessels, which may take the form of tanks or flexible bladders, typically include a fresh water vessel and one or more waste vessels. The vessels are each typically disposed in an area between the longitudinal chassis members and between two of the cross members. A height, and therefore a storage volume, of each vessel is typically limited to the height of the cross members so that the vessel does not extend below the framework of the chassis and is at least partially protected by the longitudinal and cross members. The storage volume of the vessels partially determines how long a recreational vehicle may be operated before it is necessary to fill and drain the respective vessels. Increased storage volume is desirable.

SUMMARY OF THE INVENTION

According to the subject matter of the present disclosure, recreational vehicles (RVs) have a chassis with cross members interconnecting longitudinal chassis members so as to provide a transport area for at least one storage vessel. Recreational vehicles encompassed by the present disclosure include trailer-type recreational vehicles, which include fifth wheel trailers and other types of towable campers, toy haulers, etc. Recreational vehicles encompassed by the present disclosure also include motorized recreational vehicles, like motor homes.

The present inventors have recognized that a chassis of a recreational vehicles may be constructed to provide a taller transport area for a storage vessel by use of cross members having an increased height in a midsection as compared to the ends. The transport area, extending longitudinally between two of the cross members, transversely between the longitudinal members, and vertically between upper and lower edges of the cross members, has an increased midsection height thereby allowing room for a storage vessel with increased height and/or a storage vessel plus ducts and/or pipes.

In accordance with one embodiment of the present disclosure, a recreational vehicle may include a chassis, an axle assembly coupled to the chassis and providing motive support and underbody clearance to the chassis, a floor defining a lower limit of living quarters, and a vehicle body generally enclosing the living quarters. The vehicle body and the floor are supported by the chassis. At least one fluid storage vessel is supported in the chassis. The chassis includes a first and a second longitudinal chassis member each having an upper edge and a lower edge, and an inner face and an outer face. A plurality of cross members each have a first end connected to the first longitudinal chassis member and a second end connected to the second longitudinal chassis member such that the plurality of cross members extend between and interconnect the first and second longitudinal chassis members. Each of the plurality of cross members have an upper edge and a lower edge extending between the first and second ends. Each of the plurality of cross members has an end height defined as a vertical distance between the lower edge and upper edge at the first and second ends and a midsection height defined as a vertical distance between the lower edge and upper edge of a midsection of each of the plurality of cross members, the midsection height being greater than the end height. A transport area extends longitudinally between two of the plurality of cross members, transversely between inner faces of the first and second longitudinal chassis members, and vertically between upper and lower edges of the two cross members. The at least one fluid storage vessel is disposed in at least a portion of the transport area.

In accordance with another embodiment of the present disclosure, a recreational vehicle may include a chassis, an axle assembly coupled to the chassis and providing motive support and underbody clearance to the chassis, a floor defining a lower limit of living quarters, and a vehicle body generally enclosing the living quarters. The vehicle body and the floor are supported by the chassis. At least one fluid storage vessel is supported in the chassis. At least one elongated HVAC duct and/or elongated fluid-conducting pipe extends longitudinally below the floor and is supported by the chassis. The chassis includes a first and a second longitudinal chassis member each having an upper edge and a lower edge, and an inner face and an outer face. A plurality of cross members each have a first end connected to the first longitudinal chassis member and a second end connected to the second longitudinal chassis member such that the plurality of cross members extend between and interconnect the first and second longitudinal chassis members. Each of the plurality of cross members have an upper edge and a lower edge extending between the first and second ends. Each of the plurality of cross members has an end height defined as a vertical distance between the lower edge and upper edge at the first and second ends and a midsection height defined as a vertical distance between the lower edge and upper edge of a midsection of each of the plurality of cross members, the midsection height being greater than the end height. A transport area extends longitudinally between two of the plurality of cross members, transversely between inner faces of the first and second longitudinal chassis members, and vertically between upper and lower edges of the two cross members. The at least one elongated duct and/or pipe is disposed in at least a portion of the transport area and passes through at least one of the plurality of cross members.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION OF THE INVENTION

The present disclosure is directed to recreational vehicles with a chassis configured to provide a transport area with increased height for a fluid storage vessel. The chassis cross members have a midsection that is taller than the ends of the cross members. As used in the present disclosure, a "recreational vehicle" may refer to any motor vehicle or trailer which includes living quarters designed for accommodation. Types of recreational vehicles may include, but are not limited to, motorhomes, campervans, caravans (also known as travel trailers and camper trailers), fifth-wheel trailers, gooseneck trailers, popup campers, and truck campers. Recreational vehicles may also include toy haulers or car haulers with living quarters. Recreational vehicles of the present disclosure may include in-frame or above-frame slide systems.

Figure 1:
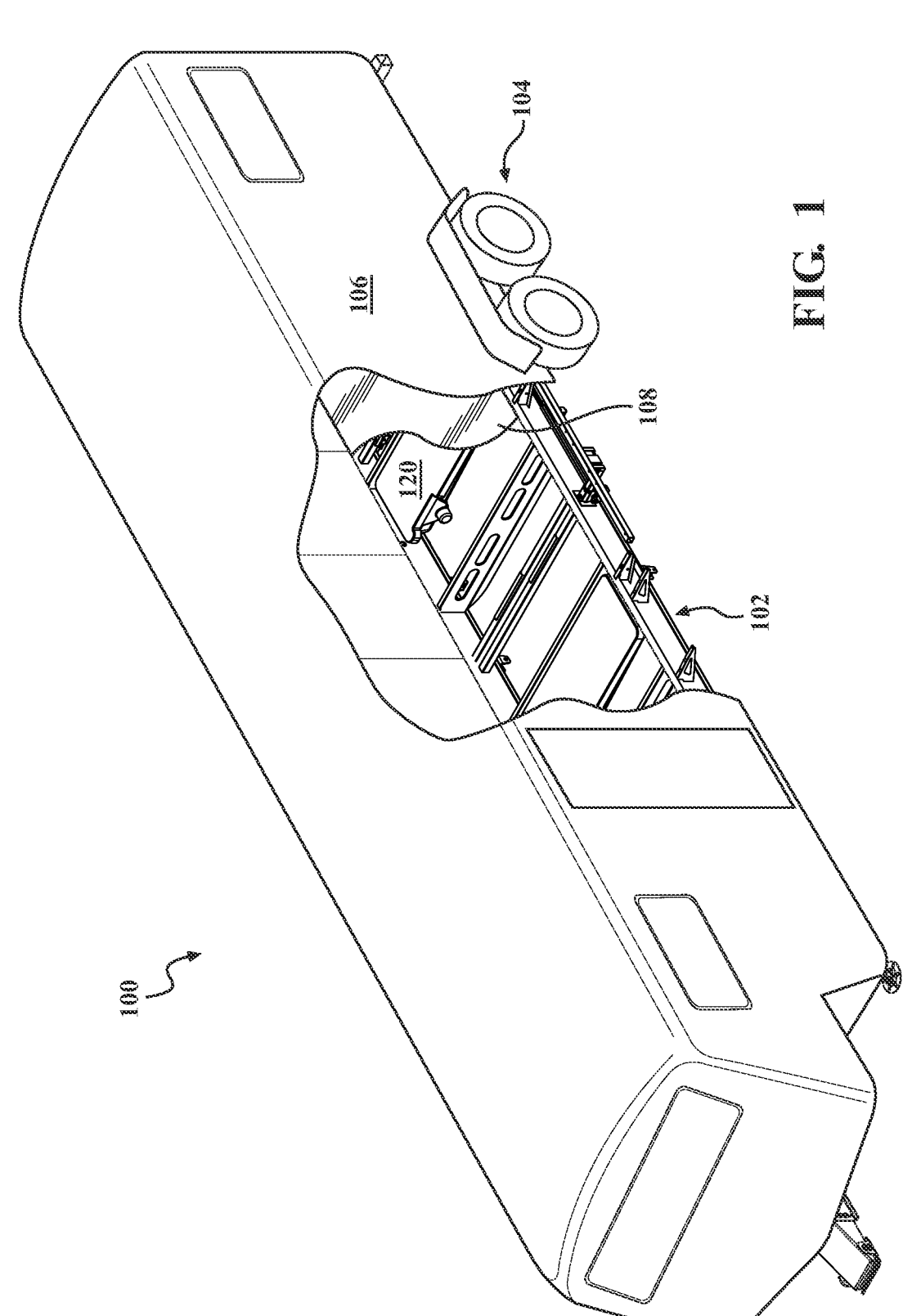
FIG. 1 is a schematic illustration of a recreational vehicle according to one embodiment of the present disclosure.

Referring initially to FIG. 1, a recreational vehicle 100 may include a chassis 102 and at least one axle assembly 104 coupled to the chassis and providing motive support and underbody clearance to the chassis. A vehicle body 106 may be supported by the chassis 102, with the vehicle body generally enclosing the living quarters. The recreational vehicle 100 also has a floor 108 that defines a lower limit of the living quarters and is supported by the chassis. In this example, the recreational vehicle 100 is a towable trailer without a powertrain.

At least one fluid storage vessel 120 is supported in the chassis 102. Such fluid storage vessels may take the form of a tank, as shown, or a flexible vessel such as a bladder. Such fluid storage vessels may be for storage of fresh water or waste, or for fuel or other liquids.

Figure 2:
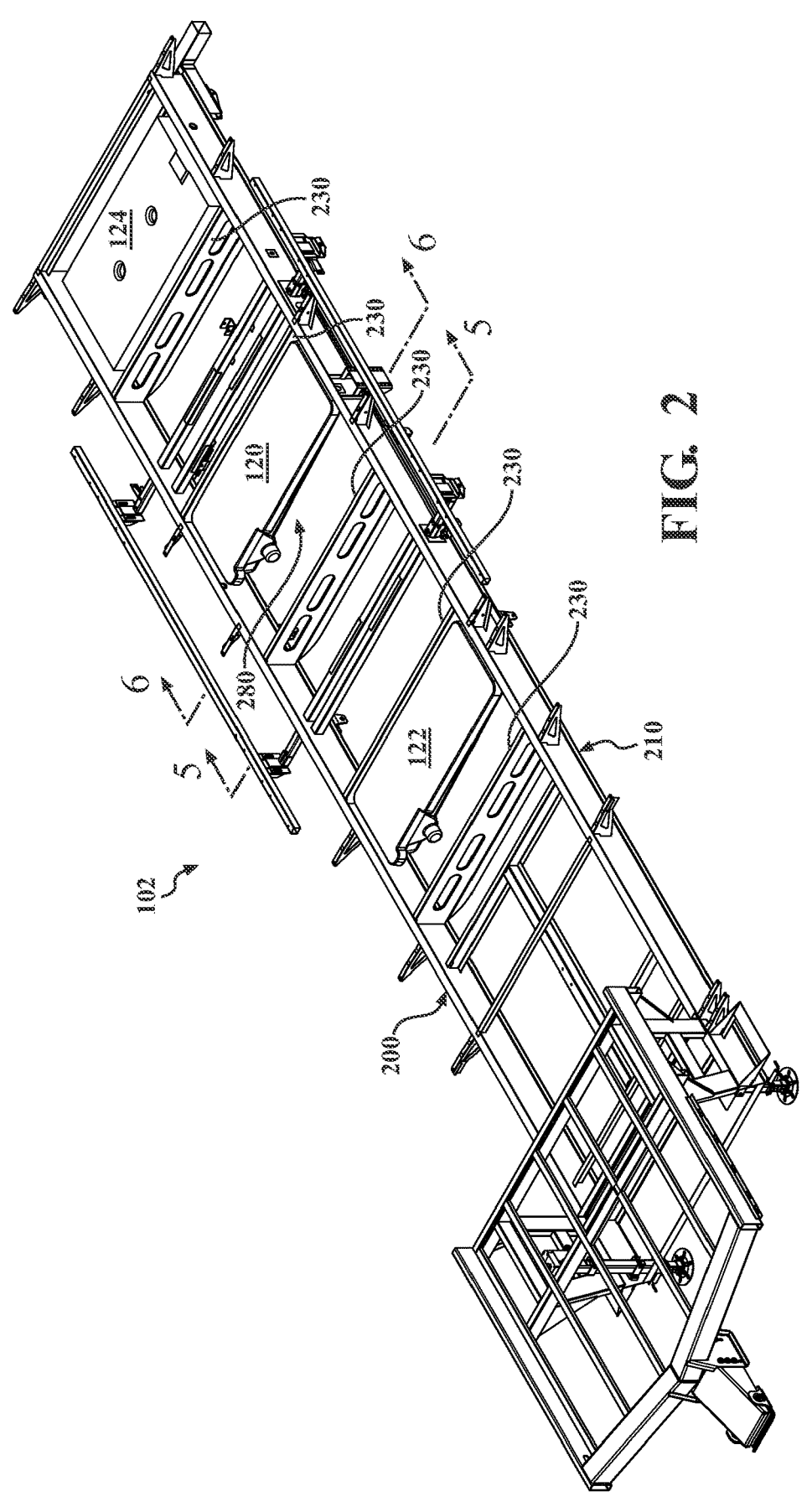
FIG. 2 is a schematic illustration of a chassis of a fifth wheel recreational vehicle according to one embodiment of the present disclosure, with three fluid storage vessels supported in the chassis.
Figure 3:
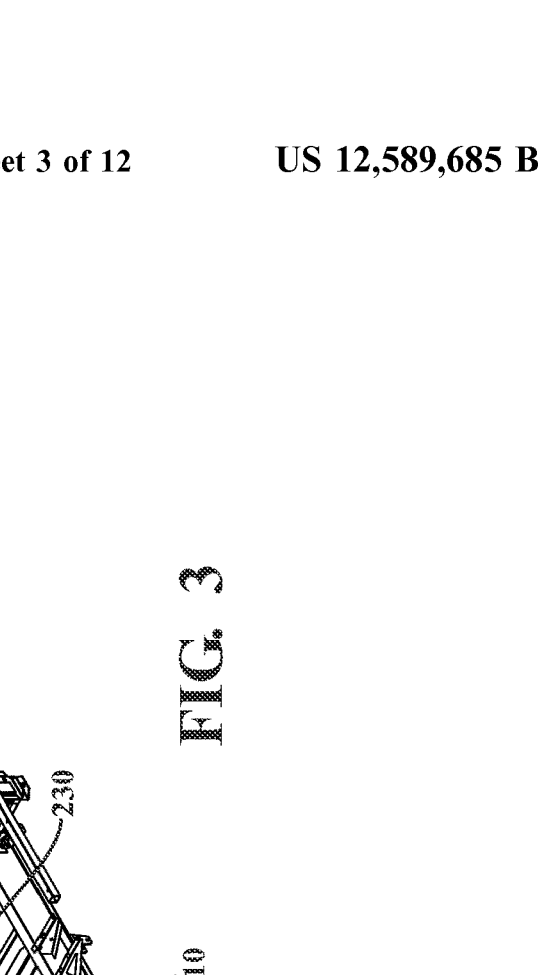
FIG. 3 is a schematic illustration of the chassis of FIG. 2 without the fluid storage vessels.

FIG. 2 illustrates the chassis 102 including three fluid storage vessels 120, 122, 124. FIG. 3 illustrates the same chassis 102 but without the fluid storage vessels. The chassis includes a first longitudinal chassis member 200 and a second longitudinal chassis member 210 that are disposed parallel to each other and extend most of the length of the chassis 102. These longitudinal chassis members 200, 210 are the main structural elements of the chassis. In the illustrated embodiment, each chassis member 200, 210 takes the form of an I-beam, though other configurations may be used.

A plurality of cross members 230 extend between and interconnect the longitudinal chassis members 200, 210. The cross members 230 are parallel to each other and spaced apart along the longitudinal length of the longitudinal chassis members 200, 210.

Figures 4A, 4B:
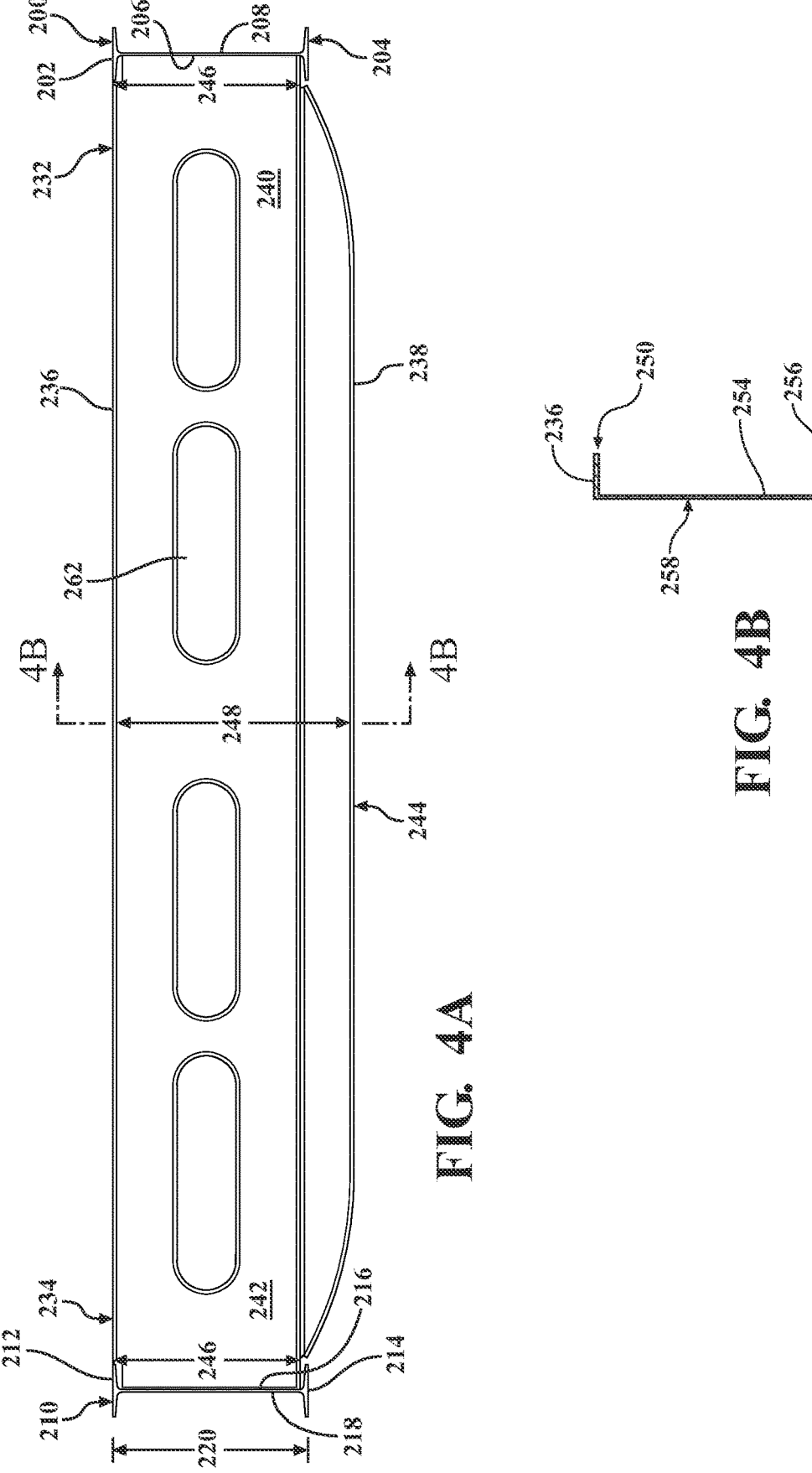
FIG. 4A is a schematic illustration of a cross member attached to two longitudinal chassis members according to an embodiment of the present invention.
FIG. 4B is a schematic illustration of a cross-sectional view of the cross member of FIG. 4A taken along lines B-B of FIG. 4A.

Referring now to FIG. 4A, an exemplary cross members 230 is illustrated in isolation with its ends attached to exemplary longitudinal chassis members 200, 210, which are shown in cross section. The first longitudinal chassis member 200 has an upper edge 202 defined by an upper flange of the I-beam and a lower edge 204 defined by the lower flange of the I-beam. The web of the I-beam, connecting the upper and lower flanges, has an inner face 206 and an opposed outer face 208. Likewise, the second longitudinal chassis member 210 has an upper edge 212, a lower edge 214, an inner face 216, and an outer face 218. In examples, the longitudinal chassis members have a height in the range of 4 inches (10.2 cm) to 12 inches (30.5 cm), typically in 2 inch (5.1 cm) increments. The flange width and part thickness varies based on height; the taller the main rail, the thicker the part and wider the flange. Chassis members other than I-beams may be used as appropriate for the application.

The cross member 230 has a first end 232 connected to the first longitudinal chassis member 200 and an opposed second end 234 connected to the second longitudinal chassis member 210. The cross member may be connected to the longitudinal chassis members in any of a variety of ways, including welding, bolting, riveting or any other method known to those of skill in the art. In the illustrated embodiment, the ends 232, 234 abut the inner faces 206, 216 of the respective longitudinal chassis members 200, 210.

The cross member 230 has an upper edge 236 and a lower edge 238. In this example, the upper edge 236 is straight end-to-end while the lower edge 238 is not straight, but instead extends downwardly from each end to a generally straight midsection. Each end 232, 234 may be said to have an end height 246 where it abuts the respective longitudinal chassis member 200, 210. The end height 246 is the vertical distance between an upper surface and a lower surface of the cross member adjacent the outermost ends, where it joins the respective longitudinal chassis member 200, 210. In the illustrated example, the upper edge at each end is notched slightly such that the cross member may be joined to the respective longitudinal chassis member 200, 210 with the remainder of the upper edge 236 of the cross member being substantially coplanar with the upper edges 202, 212 of the longitudinal chassis members 200, 210. As used herein, "substantially coplanar" means within 0.25 inches (6.4 mm), such as within 0.125 inches (3.2 mm), or such as within 0.05 inches (1.3 mm). When the upper edge 236 is referred to herein as straight or coplanar, this reference to the upper edge may exclude the upper surfaces of the immediate ends where the upper edge may be notched for joining. The end height may be defined as the height just inboard of the notches. In examples, the floor 108 is disposed on the upper edges 236 of the plurality of cross member 230, and may also be disposed on the upper edges 202, 212 of the longitudinal chassis member 200, 210, as shown in FIG. 1. Other configurations for joining the ends 232, 234 to the longitudinal chassis member 200, 210 may also be used.

Figure 5:
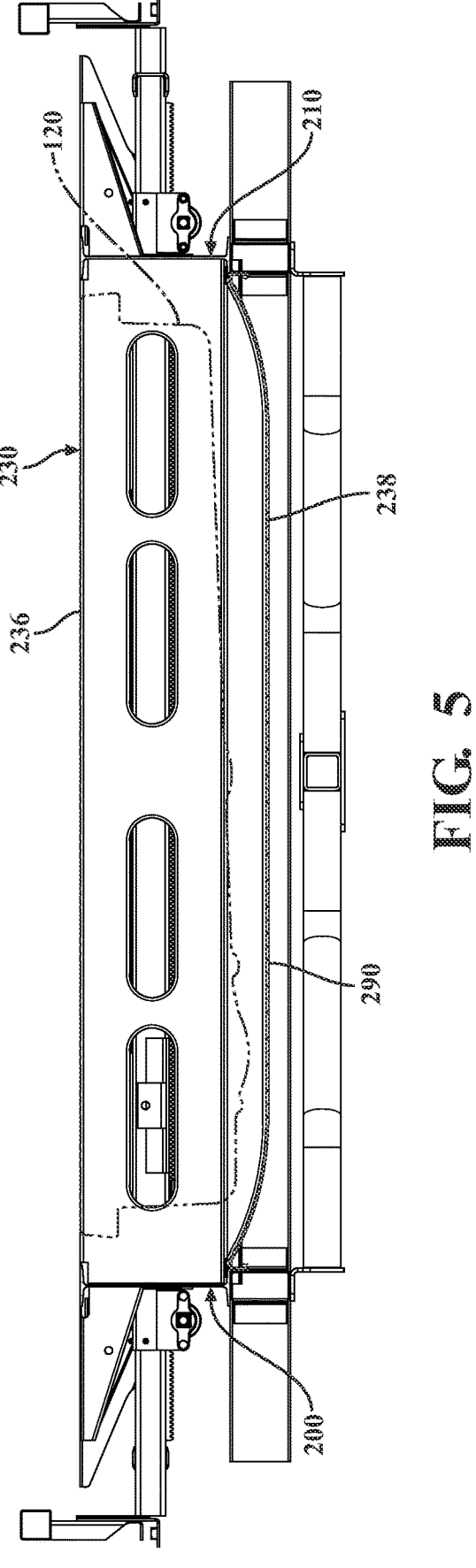
FIG. 5 is a schematic illustration of a cross-sectional view of the chassis of FIG. 2, taken along lines 5-5.

Referring to FIG. 5, the chassis 102 may include a plurality of outriggers 222. The plurality of outriggers 222 may extend laterally outward from the longitudinal chassis members 200, 210. The outriggers 222 may support an outer periphery of the floor 108 of the recreational vehicle 100. The longitudinal chassis members 200, 210 may be positioned inside wheel wells of the at least one axle assembly 104. The plurality of outriggers 222 may provide support such that the area of the floor 108 of the recreational vehicle 100 may be increased wider than a distance between the longitudinal chassis members 200, 210.

The cross member 230 may be said to have a first end portion 240 proximate the first end 232, a second end portion 242 proximate the second end 234, and a midsection 244 extending between the end portions. The midsection 244 has a midsection height 248 defined as the vertical distance between the upper edge 236 and the lower edge 238 in the midsection. In an example, the lower edge 238 of the midsection 244 is straight end-to-end and the lower edge of the end portions is angled or curved between the respective ends and the lower edge of the midsection. In an example, the midsection 244 spans a majority of a length of the cross member 230, defined as spanning more than 50% of the length. In further examples, the midsection spans at least 60% or at least 70% or at least 80% of the length. As shown, the midsection height 248 is greater than the end height 246. In examples, the midsection height is at least 20%, or at least 25%, or at least 50%, or at least 70%, or about 75% greater than the end height 246. In examples, the midsection height 248 is greater than the end height 246 by at least 1 inch (2.5 cm), such as by at least 2 inches (5.1 cm), such as approximately 3 inches (7.6 cm), or such as at least 3 inches (7.6 cm). In an example, the height is greater by 1-8 inches (2.5-20.3 cm), such as 3-6 inches (7.6-15.2 cm). In an example, the end height is approximately 4 inches (10.2 cm) and the midsection height is approximately 7 inches (7.6 cm). In another example, the end height is approximately 12 inches (30.5 cm) and the midsection height is approximately 15 inches (38.1 cm).

FIG. 4B provides a cross sectional view of the cross member 230, taken along lines B-B in FIG. 4A. In examples, the cross member is a stamped member having an upper flange 250 defining the upper edge 236 and a lower flange 252 defining the lower edge 238, with each flange 250, 252 extending end-to-end. Each of these flanges may extend generally perpendicularly to a generally vertical face 254 of the cross member. In the illustrated example, the cross member has an intermediate flange 256 extending end-to-end and positioned between the upper flange 250 and lower flange 252. In this example, the upper flange 250 and the intermediate flange 256 are both straight end-to-end while the lower flange 252 is shaped to provide the increased midsection height discussed above.

In the illustrated example, the cross member 230 is formed as two pieces, with a first piece 258 extending from the upper flange 250 to the intermediate flange 256 and a second piece 260 extending from the intermediate flange 256 to the lower flange 252. The first and second pieces 258, 260 are interconnected, such as by welding, to form the cross member. The first and second pieces 258, 260 may each be stamped. In the illustrated embodiment, the intermediate flange 256 has two layers due to the joining of the two pieces. In an example, the first and second pieces 258, 260 are stamped from metal having a thickness of approximately 14 ga. or 0.0747 inches (1.9 mm). The end height 246 of the cross member 230 may be equal to the height of the first piece 258 while the midsection height is the combined height of the first piece 258 and second piece 260.

In an example, each of the plurality of cross members 230 has at least one opening 262 in a vertical face 254 of the cross member.

Referring again to the example in FIG. 4A, the upper edge 236 of the cross member 230 at the first end 232 is proximate the upper edge 202 of the first longitudinal chassis member 200 and the upper edge 236 of the cross members at the second end 234 is proximate the upper edge 212 of the second longitudinal chassis member 210. As used herein, "proximate" is defined as being within 0.5 inches (12.7 mm), such as within 0.25 inches (6.4 mm), such as with 0.125 inches (3.2 mm). This proximate positioning may allow for the majority of the upper edge 236 of the cross member 230 do be substantially coplanar with the upper edges 202, 212 of the longitudinal chassis member 200, 210. The majority of the upper edge is defined as spanning more than 50% of the entire length. In further examples, the coplanar portion spans at least 60% or at least 70% or at least 80% or at least 90% or at least 95% of the length.

In the example of FIG. 4A, the lower edge 238 of the cross member 230 at the first end 232 is proximate the lower edge 204 of the first longitudinal chassis member 200 and the lower edge 238 of the cross member at the second end 234 is proximate the lower edge 214 of the second longitudinal chassis member 210, with proximate being defined as above. As such, the end height 246 of the cross member 230 is approximately equal to the vertical height 220 of the longitudinal chassis members 200, 210. As used herein, "approximately equal" is defined as being within 0.5 inches (12.7 mm), such as within 0.25 inches (6.4 mm), such as with 0.125 inches (3.2 mm). In examples, the midsection height is at least 20%, or at least 25%, or at least 50%, or at least 70%, or about 75% greater than the vertical height 220. In examples, the midsection height 248 is greater than the vertical height 220 by at least 1 inch (2.5 cm), such as by at least 2 inches (5.1 cm), such as approximately 3 inches (7.6 cm), or such as at least 3 inches (7.6 cm). In an example, the height is greater by 1-8 inches (2.5-20.3 cm), such as 3-6 inches (7.6-15.2 cm). In an example, the vertical height 220 is approximately 4 inches (10.2 cm) and the midsection height is approximately 7 inches (7.6 cm). In another example, the vertical height 220 is approximately 12 inches (30.5 cm) and the midsection height is approximately 15 inches (38.1 cm). The midsection 244 therefore extends below the lower edges 204, 214 of the longitudinal chassis members 200, 210.

Referring again to FIG. 3, the chassis 102 may include at least one additional cross member extending between the first and second longitudinal chassis members 200, 210 and the at least one additional cross member may have upper and lower edges that are both straight end-to-end, without an increased midsection height. An example of such a cross member is shown at 270. Cross member 270 has a reduced height overall, but other cross members without the increased midsection height may be provided with other heights and in other locations depending on the structural requirements of the chassis.

Figure 6:
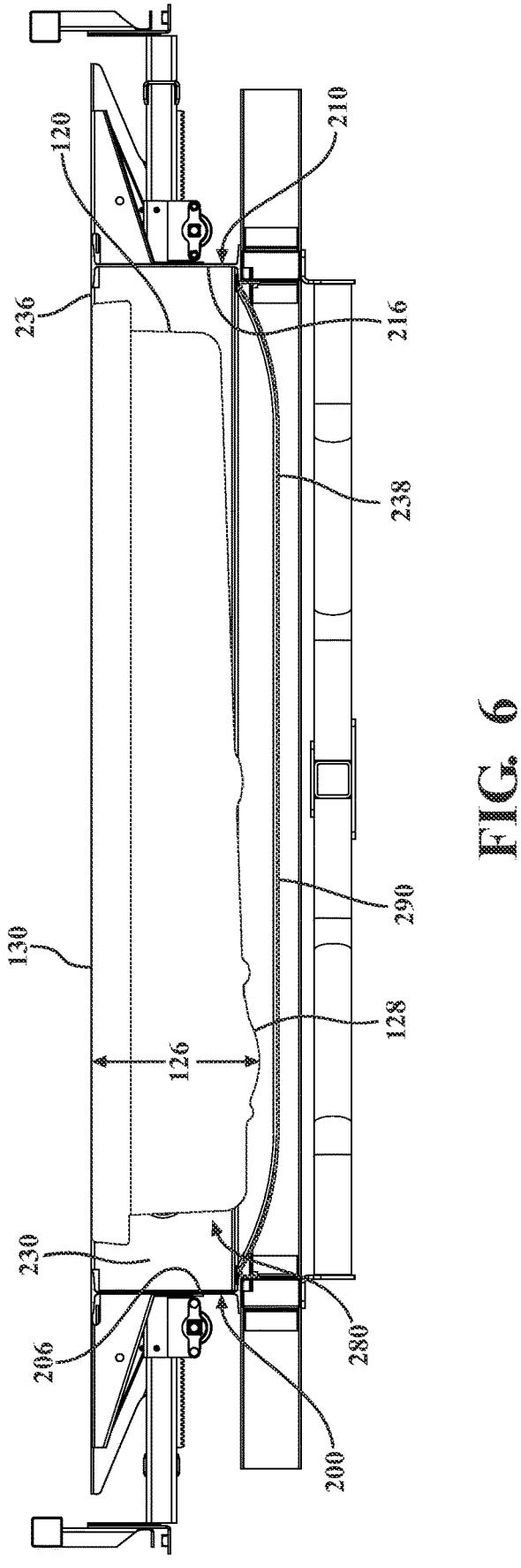
FIG. 6 is a schematic illustration of a cross-sectional view of the chassis of FIG. 2 taken along lines 6-6.

Referring now to FIGS. 2, 5 and 6, the chassis disclosed herein may provide for an increased height of a fluid storage vessel. FIG. 5 provides a cross-sectional view of the chassis of FIG. 2, taken along lines 5-5 and FIG. 6 provides a cross-sectional view taken along lines 6-6. In FIG. 5, a cross member 230 is shown with the fluid storage vessel 120 shown in phantom lines, to show the relative positions. In FIG. 6, the fluid storage vessel 120 is shown in front of a cross member 230. Because the lower edge 238 of the cross member 230 is lower than for a traditional cross member, and because the midsection height is greater than for a traditional cross member, the fluid storage vessel may have a greater height, and therefore a greater volume, while still being at or above the lower edge 238 of the cross member.

A transport area 280 may be defined as extending longitudinally between two of the plurality of cross members 230, transversely between inner faces 206, 216 of the first and second longitudinal chassis members 200, 210, and vertically between upper and lower edges 236, 238 of the two cross members 230. The fluid storage vessel 120 is disposed in the transport area 280. Additional transport areas are provided for any additional fluid storage vessels, such as vessels 122 and 124. The fluid storage vessel has a maximum height 126, such as between its lowermost point and its uppermost point. This maximum height may exclude a lowermost point of an attachment for draining. In an example, the fluid storage vessel 120 may have a maximum height approximately equal to the midsection height of the cross members. The fluid storage vessel has a lower surface 128 disposed at or above the lower edges 238 of the plurality of cross members and an upper surface 130 at or below the upper edges 236 of the cross members 230.

In examples, the recreational vehicle further includes a belly pan 290 disposed on and extending longitudinally between the lower edges 238 of the plurality of cross members 230 and extending transversely between the first and second longitudinal chassis members 200, 210. The belly pan may be formed of a semi-flexible material so as to conform to the non-straight lower edges 238 and to generally enclose the transport areas and the underside of the chassis. In an example, the belly pan is a corrugated polypropylene materials with a thickness of approximately 0.125 inches (3.2 mm).

Figure 7:
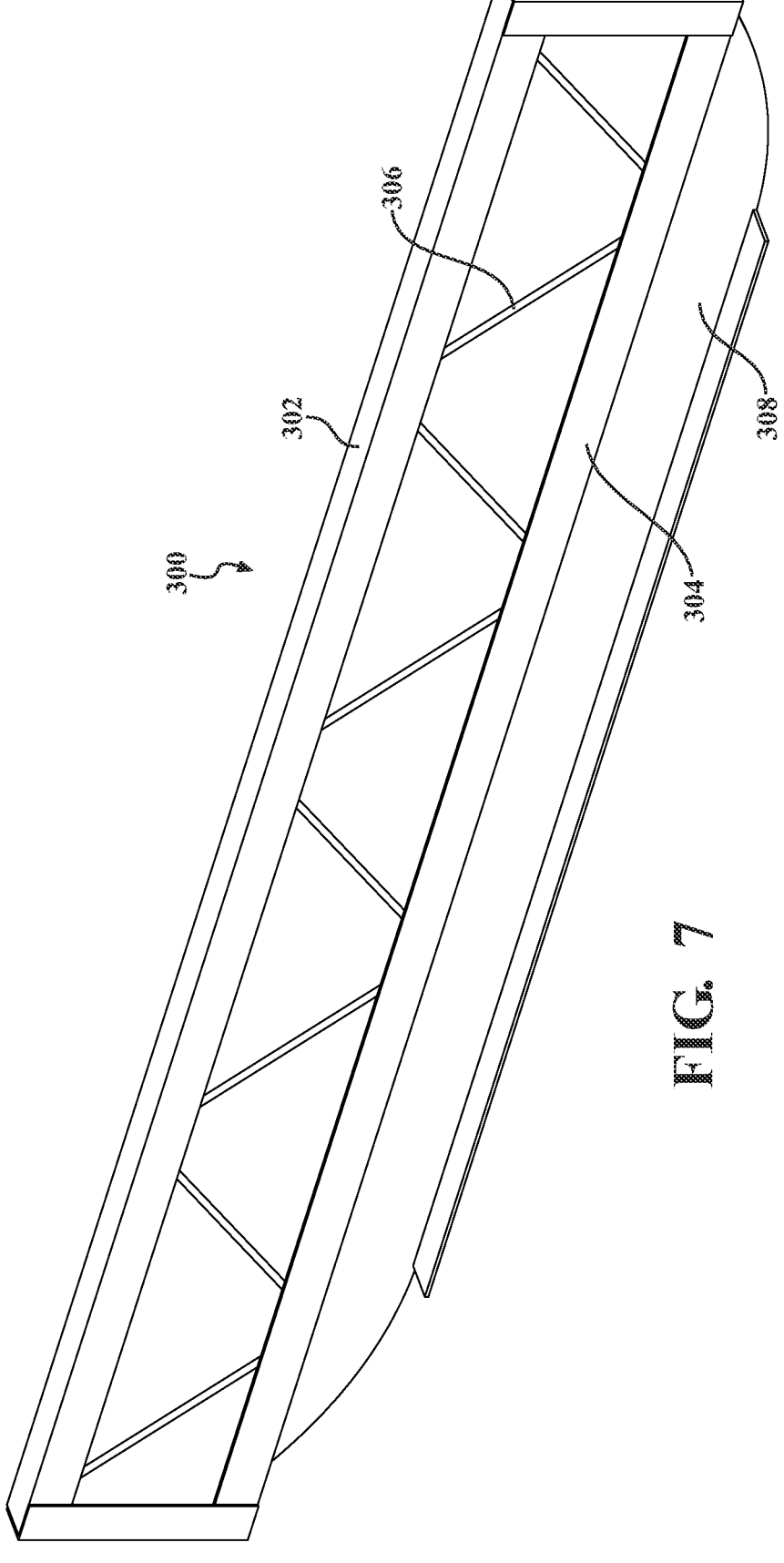
FIG. 7 is a schematic illustration of an alternative cross member for use with certain embodiments of the present disclosure.
Figure 8:
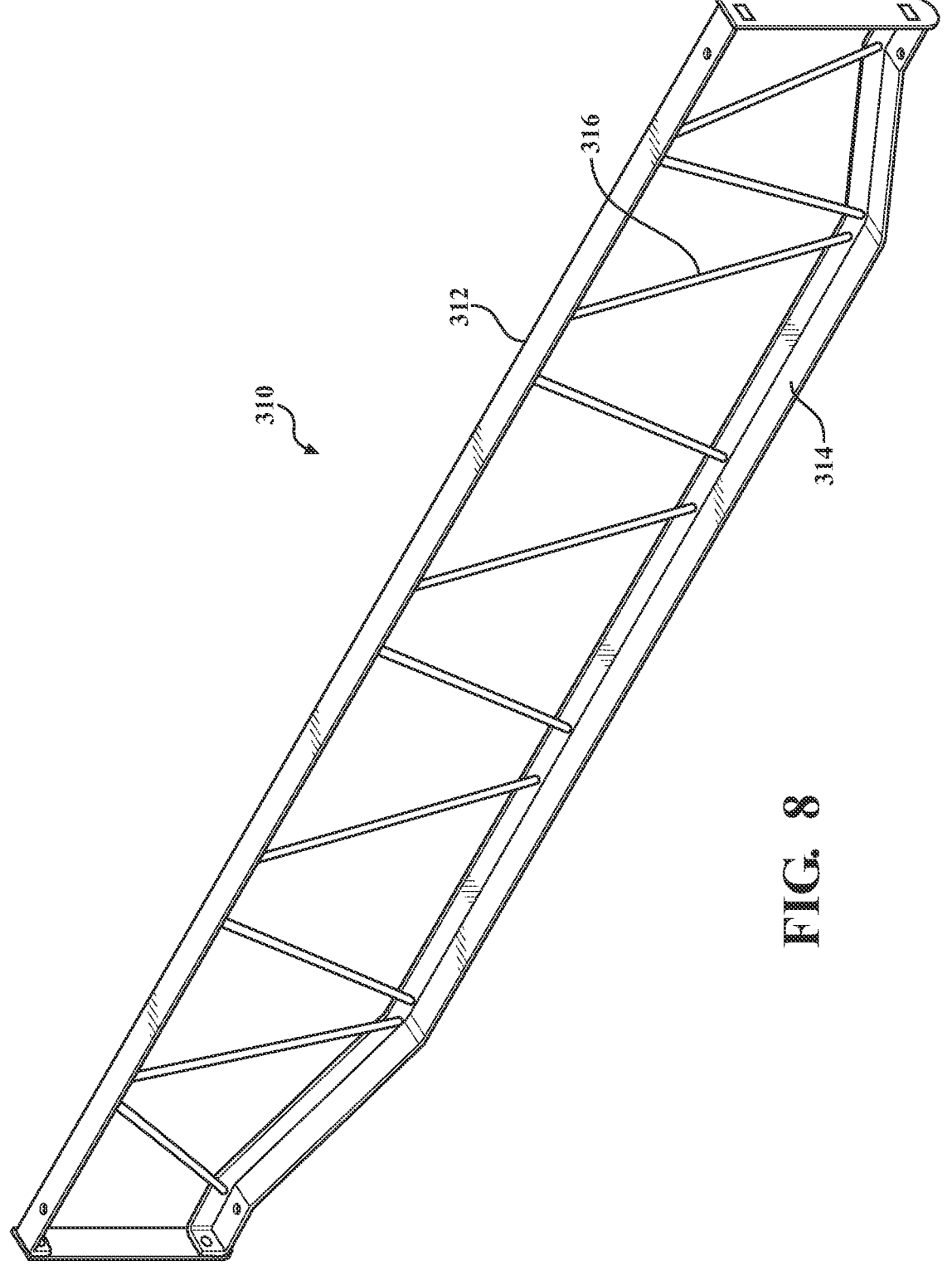
FIG. 8 is a schematic illustration of another alternative cross member for use with certain embodiments of the present disclosure.

Referring now to FIG. 7, an alternative cross member 300 for use with certain embodiments of the present disclosure is shown. This cross member is formed like a truss, with an upper member 302 defining the upper edge, a lower member 304, and a plurality of rods 306 extending between and interconnecting the upper and lower members. This cross member may have a lower piece 308 joined to the lower member 304 to define the lower edge. FIG. 8 illustrates another alternative cross member 310 for use with certain embodiments of the present disclosure. In this version, the upper member 312 is straight end-to-end while the lower member 314 defines the lower edge and is shaped to provide the increased midsection height. Rods 316 extend between and interconnect the upper and lower members. Other cross member designs may also be used, and the cross member designs may be mixed within a single chassis.

Referring now to FIGS. 9-12, alternative embodiments of a chassis and chassis cross members for a recreational vehicle are shown. The chassis and cross members are similar to the above-described embodiments. As such, only elements that have changed will be discussed. Elements with the same numbers as in prior embodiments may be the same as previously discussed.

Figure 10:
FIG. 10 is a schematic illustration of a chassis of a fifth wheel recreational vehicle according to an alternative embodiment of the present disclosure.
Figure 11:
FIG. 11 is a schematic illustration of the chassis of FIG. 10 with three fluid storage vessels supported in the chassis.

FIGS. 10 and 11 illustrate an alternative chassis 402. The chassis 402 is similar to the chassis 102 in that cross members with increased midsection height are used to provide a transport area 280, as discussed and defined above. FIG. 11 illustrates the chassis 402 with three fluid storage vessels 420, 422, 424, and FIG. 10 illustrates the same chassis 402 but without the fluid storage vessels. The fluid storage vessels 420, 422, 424 may be similar to the fluid storage vessels 120, 122, 124, respectively, but some or all of fluid storage vessels 420, 422, 424 may have a reduced depth/height as compared to the fluid storage vessels 120, 122, 124. This may allow HVAC ducts and/or fluid-conducting pipes to occupy a portion of the transport area.

As will the previously described chassis 102, the chassis 402 includes cross members with increased midsection height. Some of these cross members may be cross members 230 while others may be cross members 310, having a more open configuration. Further cross member embodiments may be used. In the embodiment of FIG. 10, a cross member 230 is used in the position forward of fluid storage vessel 422, the forwardmost vessel, and the more open cross members 310 are used in the locations forward of the cross member 230. As shown, this allows elongated HVAC ducts 430 and 432 to pass through the cross members 310 and to occupy at least a portion of the transport area 280. FIG. 11 shows an alternative mix of cross members.

Figure 9:
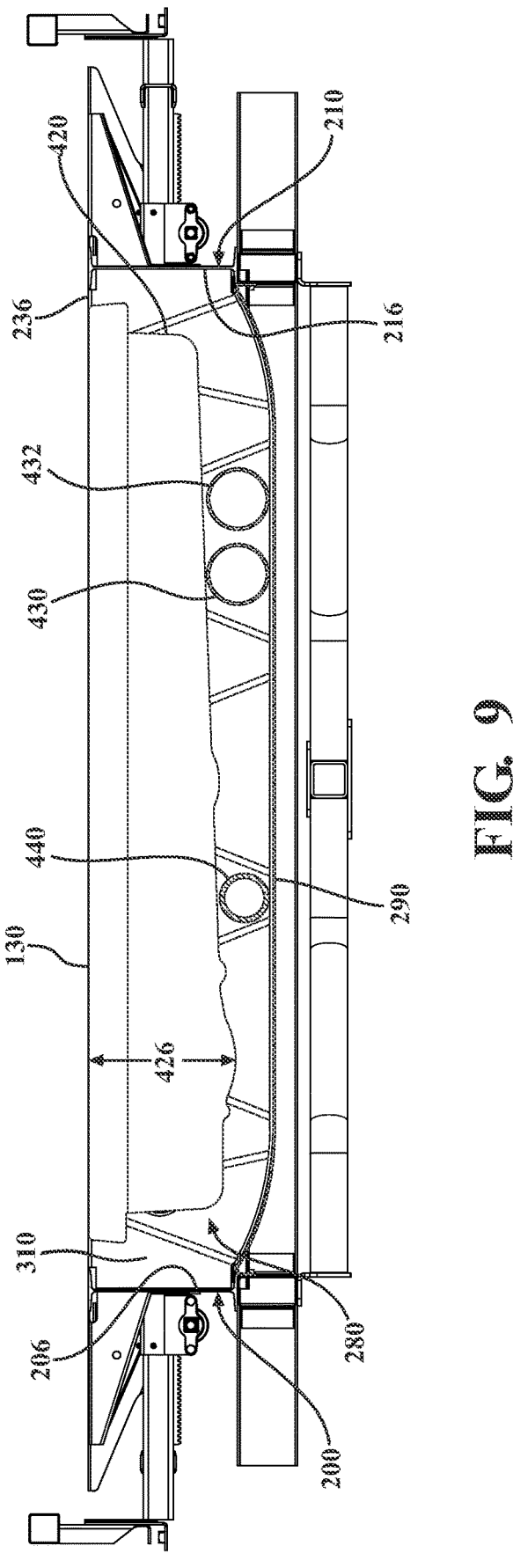
FIG. 9 is a schematic illustration of a cross-sectional view of a chassis with an alternative configuration, for use with certain embodiments of the present disclosure.

FIG. 9 provides a cross-sectional view taken along lines 9-9 of FIG. 11. The fluid storage vessel 420 is shown in front of a cross member 310. In this embodiment, the fluid storage vessel 420 occupies an upper portion of the transport area 280 and has a reduced height 426 as compared to the height 126 of the vessel 120. HVAC ducts 430 and 432 are disposed below the vessel 420 and pass through the cross member 310. It is noted that HVAC ducts 430 and 432 are shown is different positions than in FIGS. 10 and 11, to illustrate flexibility in positioning. One of the HVAC ducts may be a supply while the other is a return, or both may be supplies or returns. An elongated fluid conducting pipe 440, such as a drain or supply pipe, may also be disposed in the transport area 280 and pass through the cross member.

As with prior embodiments, a belly pan 290 may be disposed on and extend longitudinally between the lower edges of the plurality of cross members 230/310 and extend transversely between the first and second longitudinal chassis members 200, 210. The belly pan 290 may therefore enclose the HVAC ducts and/or pipes.

Figure 12:
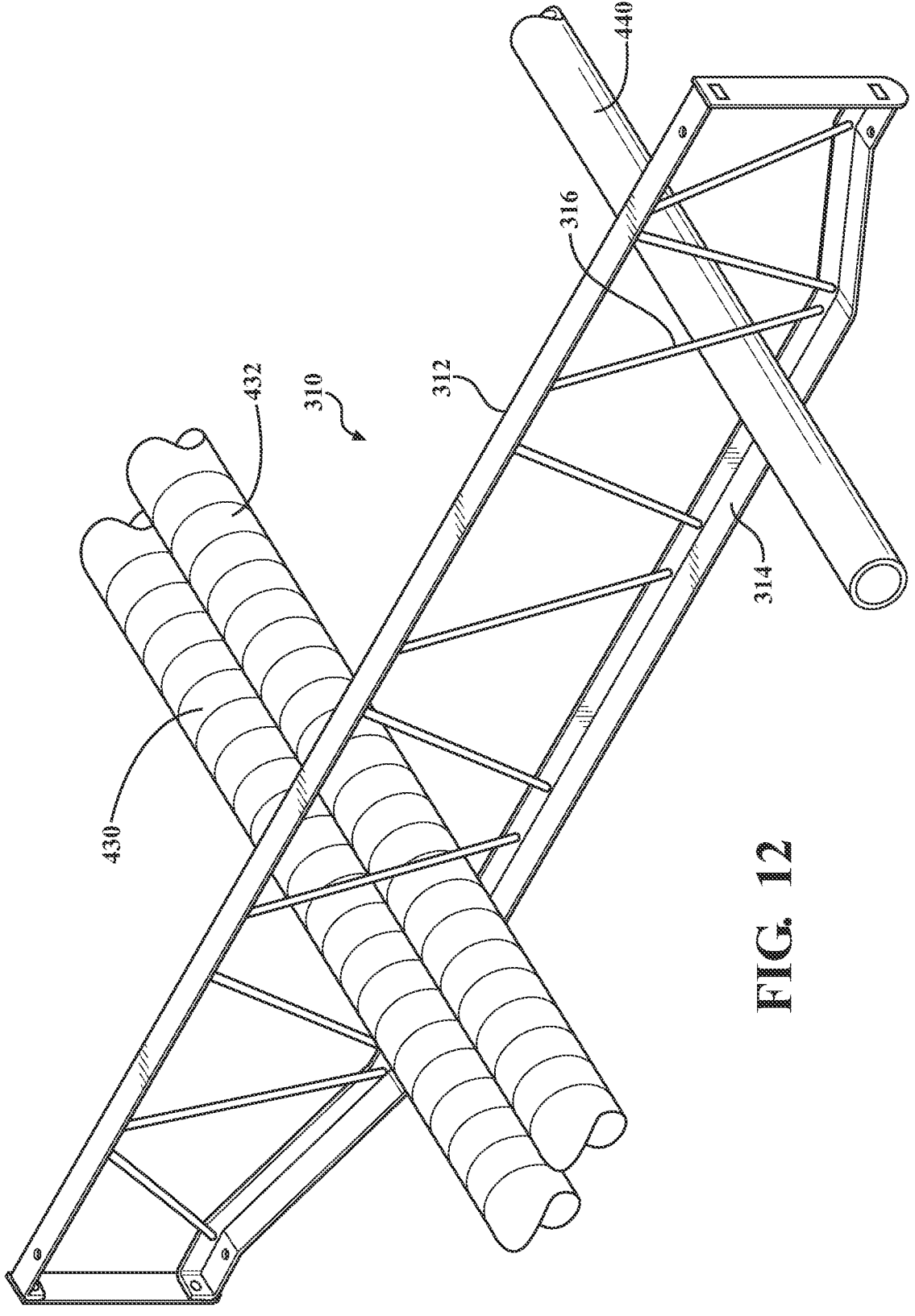
FIG. 12 is a schematic illustration of a cross member showing two elongated HVAC ducts and elongated fluid-conducting pipe extending through the cross member.

FIG. 12 provides a perspective view of a cross member 310 with the ducts 430, 432 and pipe 440 passing through the cross member.

One or more aspects of the present disclosure are described here. A first aspect of the present disclosure may include a chassis, an axle assembly coupled to the chassis and providing motive support and underbody clearance to the chassis, a floor defining a lower limit of living quarters, and a vehicle body generally enclosing the living quarters. The vehicle body and the floor are supported by the chassis. At least one fluid storage vessel is supported in the chassis. The chassis includes a first and a second longitudinal chassis member each having an upper edge and a lower edge, and an inner face and an outer face. A plurality of cross members each have a first end connected to the first longitudinal chassis member and a second end connected to the second longitudinal chassis member such that the plurality of cross members extend between and interconnect the first and second longitudinal chassis members. Each of the plurality of cross members have an upper edge and a lower edge extending between the first and second ends. Each of the plurality of cross members has an end height defined as a vertical distance between the lower edge and upper edge at the first and second ends and a midsection height defined as a vertical distance between the lower edge and upper edge of a midsection of each of the plurality of cross members, the midsection height being greater than the end height. A transport area extends longitudinally between two of the plurality of cross members, transversely between inner faces of the first and second longitudinal chassis members, and vertically between upper and lower edges of the two cross members. The at least one fluid storage vessel is disposed in at least a portion of the transport area.

A second aspect of the present disclosure may include the first aspect, further comprising at least one elongated HVAC duct and/or elongated fluid-conducting pipe extending longitudinally below the floor and supported by the chassis, wherein the at least one elongated duct and/or pipe is disposed in at least a portion of the transport area and passes through at least one of the plurality of cross members.

A third aspect of the present disclosure may include the first or second aspect, wherein the at least one fluid storage vessel is disposed above the at least one elongated duct and/or pipe in the transport area A fourth aspect of the present disclosure may include any one of the first through third aspects, wherein the at least one elongated duct and/or pipe comprises at least one elongated HVAC duct and at least one elongated fluid-conducting pipe.

A fifth aspect of the present disclosure may include any one of the first through fourth aspects, wherein the at least one elongated HVAC duct comprises at least a supply duct and a return duct.

A sixth aspect of the present disclosure may include any one of the first through fifth aspects, further comprising a belly pan disposed on and extending longitudinally between the lower edges of the plurality of cross members and extending transversely between the first and second longitudinal chassis members, thereby enclosing the at least one elongated duct and/or pipe.

A seventh aspect of the present disclosure may include any one of the first through sixth aspects, wherein the upper edge of each the plurality of cross members at the first end is proximate the upper edge of the first longitudinal chassis member, the upper edge of each of the plurality of cross members at the second end is proximate the upper edge of the second longitudinal chassis member, the lower edge of each the plurality of cross members at the first end is proximate the lower edge of the first longitudinal chassis member and the lower edge of each of the plurality of cross members at the second end is proximate the lower edge of the second longitudinal chassis member, the midsection height of each of the plurality of cross members is greater than a vertical height of the longitudinal chassis members, and the floor is disposed on the upper edges of the plurality of cross members.

An eighth aspect may of the present disclosure may include any one of the first through seventh aspects, wherein the at least one fluid storage vessel is a tank.

A ninth aspect may of the present disclosure may include any one of the first through the eighth aspect, further comprising a belly pan disposed on and extends longitudinally between the lower edges of the plurality of cross members and extending transversely between the first and second longitudinal chassis members.

A tenth aspect of the present disclosure may include any one of the first through ninth aspects, wherein the upper edge of each of the plurality of cross members is straight end-to-end, the midsection of each of the plurality of cross members spans a majority of a length of the cross members, the lower edge of the midsection being straight end-to-end, and each of the plurality of cross members has a first and second end portion, and the lower edge of the end portions is angled or curved between the respective ends of the cross member and the lower edge of the midsection.

An eleventh aspect of the present disclosure may include any one of the first through tenth aspects, wherein the chassis further comprises at least one additional cross member extending between the first and second longitudinal chassis members, the at least one additional cross member having a lower edge that is straight end-to-end.

A twelfth aspect of the present disclosure may include any one of the first through eleventh aspects, wherein each of the plurality of cross members has at least one opening in a vertical face of the cross member.

A thirteenth aspect of the present disclosure may include any one of the first through twelfth aspects, wherein each of the plurality of cross members has an upper member defining the upper edge, a lower member, and a plurality of rods extending between and interconnecting the upper and lower members.

An fourteenth aspect of the present disclosure may include any one of the first through thirteenth aspects, wherein the recreational vehicle is a towable trailer without a powertrain.

A fifteenth aspect of the present disclosure may include a chassis, an axle assembly coupled to the chassis and providing motive support and underbody clearance to the chassis, a floor defining a lower limit of living quarters, and a vehicle body generally enclosing the living quarters. The vehicle body and the floor are supported by the chassis. At least one fluid storage vessel is supported in the chassis. At least one elongated HVAC duct and/or elongated fluid-conducting pipe extends longitudinally below the floor and is supported by the chassis. The chassis includes a first and a second longitudinal chassis member each having an upper edge and a lower edge, and an inner face and an outer face. A plurality of cross members each have a first end connected to the first longitudinal chassis member and a second end connected to the second longitudinal chassis member such that the plurality of cross members extend between and interconnect the first and second longitudinal chassis members. Each of the plurality of cross members have an upper edge and a lower edge extending between the first and second ends. Each of the plurality of cross members has an end height defined as a vertical distance between the lower edge and upper edge at the first and second ends and a midsection height defined as a vertical distance between the lower edge and upper edge of a midsection of each of the plurality of cross members, the midsection height being greater than the end height. A transport area extends longitudinally between two of the plurality of cross members, transversely between inner faces of the first and second longitudinal chassis members, and vertically between upper and lower edges of the two cross members. The at least one elongated duct and/or pipe is disposed in at least a portion of the transport area and passes through at least one of the plurality of cross members.

It is also noted that recitations herein of "at least one" component, element, etc., should not be used to create an inference that the alternative use of the articles "a" or "an" should be limited to a single component, element, etc. For example, the use of "at least one fluid storage vessel" should not be interpreted to mean that the recreational vehicle can only include one fluid storage vessel.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about," and "approximately," unless otherwise defined, are utilized herein to represent the inherent degree of uncertainty that may be attributed to any quantitative comparison, value, measurement, or other representation. The terms "substantially," "about," and "approximately," unless otherwise defined, are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle of the type having living quarters defined therein, the recreational vehicle comprising:
    a chassis;
    an axle assembly coupled to the chassis and providing motive support and underbody clearance to the chassis;
    a floor defining a lower limit of the living quarters;
    a vehicle body generally enclosing the living quarters, the vehicle body and the floor being supported by the chassis; and
    at least one fluid storage vessel supported in the chassis;
    wherein the chassis comprises;

a first and a second longitudinal chassis member each having an upper edge and a lower edge, and an inner face and an outer face; and
    a plurality of cross members each having a first end connected to the first longitudinal chassis member and a second end connected to the second longitudinal chassis member such that the plurality of cross members extend between and interconnect the first and second longitudinal chassis members, each of the plurality of cross members having an upper edge and a lower edge extending between the first and second ends;
    wherein each of the plurality of cross members has an end height defined as a vertical distance between the lower edge and upper edge at the first and second ends and a midsection height defined as a vertical distance between the lower edge and upper edge of a midsection of each of the plurality of cross members, the midsection height being greater than the end height; and
    wherein a transport area extends longitudinally between two of the plurality of cross members, transversely between inner faces of the first and second longitudinal chassis members, and vertically between upper and lower edges of the two cross members, the at least one fluid storage vessel being disposed in at least a portion of the transport area.

2. The recreational vehicle according to claim 1, further comprising:
    at least one elongated HVAC duct and/or elongated fluid-conducting pipe extending longitudinally below the floor and supported by the chassis;
    wherein the at least one elongated duct and/or pipe is disposed in at least a portion of the transport area and passes through at least one of the plurality of cross members.

3. The recreational vehicle according to claim 2, wherein the at least one fluid storage vessel is disposed above the at least one elongated duct and/or pipe in the transport area.

4. The recreational vehicle according to claim 2, wherein the at least one elongated duct and/or pipe comprises at least one elongated HVAC duct and at least one elongated fluid-conducting pipe.

5. The recreational vehicle according to claim 4, wherein the at least one elongated HVAC duct comprises at least a supply duct and a return duct.

6. The recreational vehicle according to claim 2, further comprising a belly pan disposed on and extending longitudinally between the lower edges of the plurality of cross members and extending transversely between the first and second longitudinal chassis members, thereby enclosing the at least one elongated duct and/or pipe.

7. The recreational vehicle according to claim 1, wherein:
    the upper edge of each the plurality of cross members at the first end is proximate the upper edge of the first longitudinal chassis member;
    the upper edge of each of the plurality of cross members at the second end is proximate the upper edge of the second longitudinal chassis member;
    the lower edge of each the plurality of cross members at the first end is proximate the lower edge of the first longitudinal chassis member and the lower edge of each of the plurality of cross members at the second end is proximate the lower edge of the second longitudinal chassis member;
    the midsection height of each of the plurality of cross members is greater than a vertical height of the longitudinal chassis members; and the floor is disposed on the upper edges of the plurality of cross members.

8. The recreational vehicle according to claim 1, wherein the at least one fluid storage vessel is a tank.

9. The recreational vehicle according to claim 1, further comprising a belly pan disposed on and extending longitudinally between the lower edges of the plurality of cross members and extending transversely between the first and second longitudinal chassis members.

10. The recreational vehicle according to claim 1, wherein:

the upper edge of each of the plurality of cross members is straight end-to-end;

the midsection of each of the plurality of cross members spans a majority of a length of the cross members, the lower edge of the midsection being straight end-to-end; and each of the plurality of cross members has a first and second end portion, and the lower edge of the end portions is angled or curved between the respective ends of the cross member and the lower edge of the midsection.

11. The recreational vehicle according to claim 1, wherein the chassis further comprises at least one additional cross member extending between the first and second longitudinal chassis members, the at least one additional cross member having a lower edge that is straight end-to-end.

12. The recreational vehicle according to claim 1, wherein each of the plurality of cross members has at least one opening in a vertical face of the cross member.

13. The recreational vehicle according to claim 1, wherein each of the plurality of cross members has an upper member defining the upper edge, a lower member, and a plurality of rods extending between and interconnecting the upper and lower members.

14. The recreational vehicle according to claim 1, wherein the recreational vehicle is a towable trailer without a powertrain.

15. A recreational vehicle of the type having living quarters defined therein, the recreational vehicle comprising:

a chassis;

an axle assembly coupled to the chassis and providing motive support and underbody clearance to the chassis;

a floor defining a lower limit of the living quarters;

a vehicle body generally enclosing the living quarters, the vehicle body and the floor being supported by the chassis; and at least one fluid storage vessel supported in the chassis;

at least one elongated HVAC duct and/or elongated fluid-conducting pipe extending longitudinally below the floor and supported by the chassis;

wherein the chassis comprises;

a first and a second longitudinal chassis member each having an upper edge and a lower edge, and an inner face and an outer face; and a plurality of cross members each having a first end connected to the first longitudinal chassis member and a second end connected to the second longitudinal chassis member such that the plurality of cross members extend between and interconnect the first and second longitudinal chassis members, each of the plurality of cross members having an upper edge and a lower edge extending between the first and second ends;

wherein each of the plurality of cross members has an end height defined as a vertical distance between the lower edge and upper edge at the first and second ends and a midsection height defined as a vertical distance between the lower edge and upper edge of a midsection of each of the plurality of cross members, the midsection height being greater than the end height; and wherein a transport area extends longitudinally between two of the plurality of cross members, transversely between inner faces of the first and second longitudinal chassis members, and vertically between upper and lower edges of the two cross members; and wherein the at least one elongated duct and/or pipe is disposed in at least a portion of the transport area and passes through at least one of the plurality of cross members.

\* \* \* \* \*